(No Model.)
L. KISSNER.
HAY TEDDER.
No. 508,425. Patented Nov. 14, 1893.
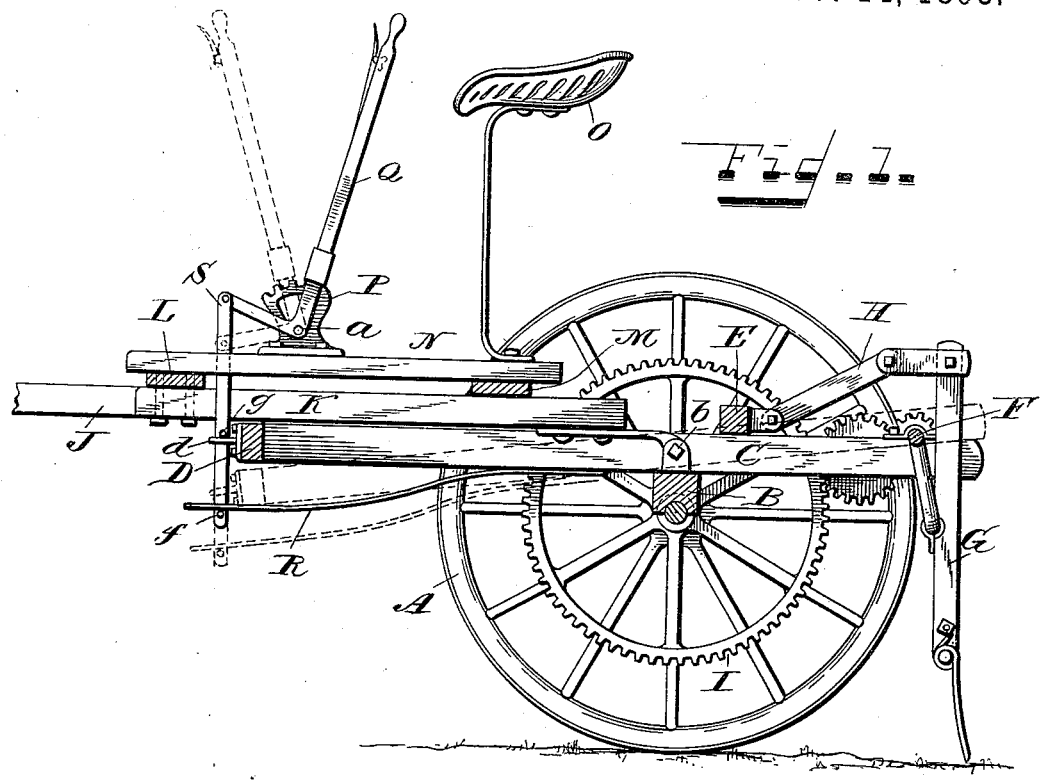
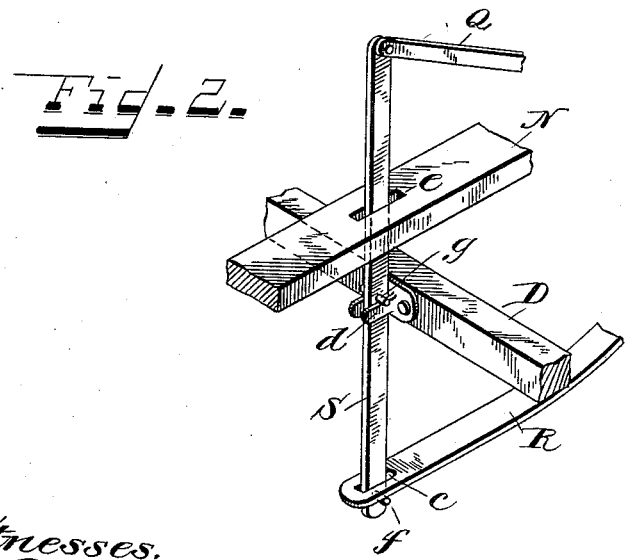
Witnesses.
J. Thomson Cross
Bernard J. Hausfeld
Inventor.
Leonard Kissner
by Chas. M. Cox
his Attorney.

UNITED STATES PATENT OFFICE.

LEONARD KISSNER, OF LANCASTER, OHIO, ASSIGNOR TO THE HOCKING VALLEY MANUFACTURING COMPANY, OF SAME PLACE.

HAY-TEDDER.

SPECIFICATION forming part of Letters Patent No. 508,425, dated November 14, 1893.

Application filed June 19, 1893. Serial No. 478,143. (No model.)

*To all whom it may concern:*

Be it known that I, LEONARD KISSNER, a citizen of the United States, residing at Lancaster, in the county of Fairfield and State of Ohio, have invented certain new and useful Improvements in Hay-Tedders, of which the following is a full, clear, and exact description, reference being had to the accompanying drawings, forming part of this specification.

My invention relates to that class of tedders having the tedding forks carried upon arms operated by a crank shaft driven by the traction of the machine; and it has for its object an improved connection between the thill and tedding frame, whereby the latter has at all times a yielding support which permits the tipping of the frame when the forks encounter obstructions in their downward thrusts.

The novelty of my invention will be hereinafter set forth and specifically pointed out in the claim.

In the accompanying drawings:—Figure 1 is a sectional side elevation of a tedder embodying my invention. Fig. 2, is an enlarged detail perspective of the connecting link, spring, and associated parts.

The same letters of reference are used to indicate identical parts in both the figures.

In general the machine may be of the usual or any suitable construction and, in describing it, it will only be necessary to say that A is one of the two carrying wheels upon the spindles of an axle B to which are secured transversely, three parallel bars C with cross bars D, E, these parts carried by the axle constituting the tedding frame upon the rear of which is journaled the crank shaft F for operating the fork arms G, whose upper ends are connected by pivoted links H to the bar E. The shaft F is driven by the usual or any suitable gearing from the gears I upon the wheels A and provision is made in any suitable manner for throwing it into and out of gear.

The thill frame is composed of the thills J, side bars K, cross bars L, M, and center bar N. Upon the latter is secured the driver's seat O and a segment rack P to which is pivoted, as at $a$, a bell crank lock lever Q of well known construction. The thill frame is hinged, as at $b$, to the axle in any suitable manner. Secured to the under side of the tedding frame at its middle, in this instance to the bar C, Fig. 1, is a flat spring R, which projects forward at its free end beyond the bar D and is slightly curved downward. A slot $c$, Fig. 2, is cut through the front end of the spring to permit the passage of the lower end of a connecting bar or link S which passes up between the ears of a guide lug $d$ secured to the front side of the bar D, a slot $e$ in the bar N, and has its upper end pivoted to the projecting arm of the lever Q. The bar S, which in this instance is flat, is held from passage upward through the slot $c$ and from passage downward between the ears of the guide lug $d$ by any suitable stops. In this instance I employ for this purpose a pin or spring cotter $f$, inserted through a perforation in the bar below the spring, and a similar pin $g$ inserted through the perforation in the bar above the ears of the lug $d$. The weight of the fork arms and crank shaft normally tends to hold the rear end of the tedding frame in working position without tension on the spring R and by the construction above described the forward end of the tedding frame may be depressed and its rear end elevated to take the forks from the ground or adjust them relatively thereto by the stops $g$ acting directly on the tedding frame through the medium of the lug $d$ without putting the spring R under tension; but when at work, should the forks in their downward strokes encounter obstacles the tedding frame can yield and be tipped forward thereby putting the spring R under tension, and immediately upon passing such obstruction the spring will retip the tedding frame to its normal working position. Thus while the driver has control of the tedding frame to adjust it by means of the lever Q a very simple connection is afforded between the two frames which permits the tedding frame to yield when the forks strike obstructions.

Having thus fully described my invention, I claim—

In a tedder, the combination of the tedding frame and the thill frame hinged together, a flat spring R made fast to the under side of the tedding frame and projecting forward with a slot in its forward free end, the lock lever Q on the thill frame, the guide lug $d$ on the tedding frame and the bar S connecting said lock lever, tedding frame and free end of the spring by means of stops $f\ g$, substantially as described.

LEONARD KISSNER.

Witnesses:
 THOS. ORMAN,
 ANDREW DAVIDSON.